United States Patent [19]

Loffredo et al.

[11] Patent Number: 5,078,204

[45] Date of Patent: Jan. 7, 1992

[54] METHOD AND APPARATUS FOR MOLDING CONFECTIONARY PRODUCTS

[75] Inventors: Eugene J. Loffredo, Palmyra; Frank A. Renda, Elizabethtown, both of Pa.

[73] Assignee: Eastern Design & Development Company, Hershey, Pa.

[21] Appl. No.: 582,257

[22] Filed: Sep. 13, 1990

[51] Int. Cl.$^5$ .................... F28F 5/02; F28D 11/02
[52] U.S. Cl. ................................... 165/89; 165/91
[58] Field of Search ............................ 165/89, 90, 91

[56] References Cited

U.S. PATENT DOCUMENTS

| | | | |
|---|---|---|---|
| 1,063,636 | 6/1913 | Barbezat | 165/91 |
| 1,649,511 | 11/1927 | Cox | 165/89 |
| 1,951,769 | 3/1934 | Pearson et al. | 165/91 |
| 2,004,009 | 6/1935 | Moir | 165/91 |
| 2,603,457 | 7/1952 | Bishop | 165/89 |
| 3,182,587 | 5/1965 | Woodhall | 165/89 |
| 3,309,786 | 3/1967 | Conti | 165/90 |
| 3,326,142 | 6/1967 | Town | 425/357 |
| 3,405,209 | 10/1968 | Aagaard et al. | 165/91 |
| 3,472,041 | 10/1969 | Amerio | 165/91 |
| 3,643,344 | 2/1972 | Strube | 165/89 |
| 4,061,178 | 12/1977 | Sivilotti et al. | 164/87 |
| 4,190,103 | 2/1980 | Sivilotti et al. | 165/120 |
| 4,300,621 | 11/1981 | Wilson | 164/485 |
| 4,351,386 | 9/1982 | Kobler | 165/89 |
| 4,393,296 | 7/1983 | Dompas | 219/121 |
| 4,420,304 | 12/1983 | Nakatani et al. | 165/91 |
| 4,459,726 | 7/1984 | O'Brien et al. | 29/116 |
| 4,498,527 | 2/1985 | Gerarts et al. | 165/89 |
| 4,665,974 | 5/1987 | Grehier et al. | 165/165 |

Primary Examiner—John Rivell
Assistant Examiner—L. R. Leo
Attorney, Agent, or Firm—Paul & Paul

[57] ABSTRACT

An apparatus and method is provided, whereby chocolate or other confection may be hardened by coming into contact with one or more confectionary rolls that have a cooling fluid supplied to the interior of the rolls. The cooling fluid causes the rolls to operate at a higher temperature than that of the confectionary medium being treated. Generally the rolls have depressions in their periphery for forming the shape of the confectionary. Inside the roll or rolls, there are provided a plurality of cooling zones at different locations preferably spaced axially along the roll from the cooling fluid inlet end of the roll. These zones may vary so as to be progressively smaller in an axial direction, as measured axially from the cooling fluid inlet end of the roll. Valving or other means are provided for controlling the flow of cooling fluid to each of the zones, preferably individually for each zone. Thus, more consistent and uniform temperature is experienced on the confectionary-contacting outer surface of the roll, such that roll temperature is not substantially influenced by the location of a particular portion of the roll from the point of introduction of cooling fluid to the roll. More uniform confectionary hardening or solidification is thus effected.

32 Claims, 4 Drawing Sheets

METHOD AND APPARATUS FOR MOLDING CONFECTIONARY PRODUCTS

FIELD OF THE INVENTION

The present invention generally relates to a method and apparatus for making confectionary products. More particularly, the invention relates to an improved method and means for molding continuously and consistently solidified confectionary products.

BACKGROUND OF THE INVENTION

In the production of various types of confectionary products, a liquefied confectionary medium, such as chocolate, is first poured into molds where it is then solidified by a cooling process, and thus molded. An apparatus oftentimes used in molding chocolate includes a roll having a number of impressions in its outer surface acting as molds into which chocolate is poured. Solidification occurs when the exterior roll surface and its impressions has a temperature sufficiently less than that of the liquefied chocolate to produce a change of state from liquid to solid. Hence, after the chocolate is poured onto the cool roller surface, and into its impressions, a heat transfer occurs between the liquefied chocolate and the roller surface, causing the chocolate to solidify. The solid chocolate then comes off the roller and onto a conveyor, whereby chocolate in the form of the impressions is separated from the connecting chocolate web.

Similarly, two confectionary rollers are also oftentimes used in the industry, wherein these rollers are placed parallel to one another with only a very small distance separating their outer surfaces. Chocolate is then poured into the space between the rollers whereupon coming in contact with the cooled surfaces, it is solidified. The solidified chocolate, having a ribbon-type shape, is then similarly delivered onto a conveyor belt and additionally processed.

A confectionary roll commonly used in the industry is comprised of an outer rotatable shell, having a cavity therein, and further having an inner rotatable shell or means for directing fluid against the inner surface of the water shell, and generally having a smaller diameter than the outer shell, with a rotatable shaft concentrically disposed therein. A cooling liquid, such as water, is passed through the annular space between the outer and inner shells, whereby the temperature on the exterior surface of the outer shell is, hence, reduced by the cooling liquid coming in contact with the interior wall of the outer shell. As a result, liquid chocolate having an elevated temperature will become solidified and molded once it comes in contact with the cooled exterior surface of the outer shell.

It has been observed that the problem associated with the use of such rollers is maintaining a consistently low exterior surface temperature along the entire length of the confectionary roll. In commonly used confectionary rolls, a cooling liquid is fed into one end of the roll and travels along its length to the other end, where it is discharged. It has also been noted that the temperature of the liquid at the introductory end of the roll is lower than the temperature at the discharging end. This is due to the cooling liquid undergoing constant heat transfer with the liquefied confectionary medium during its travels through the roll. The amount of heat transferred into the cooling liquid is smallest at the introductory end. As the liquid travels down the length of the roll it continuously accepts more heat so that the temperature of the liquid being emitted from the roll is higher than that of fresh liquid being introduced.

Consequently, it has been observed that this results in the outer shell surface having a lower temperature at the end where the liquid is introduced and a continuously increasing temperature all along the rest of the roll's length, with the surface temperatures being the highest at the end where the fluid is emitted. Chocolate being molded toward the fluid emission end of the roll can become less solidified than that at the introductory end, possibly resulting in defectively molded chocolate being produced and wasted. Alternatively, the speed of roll rotation, and consequently the ability of the apparatus to rapidly produce solidified confection, would be limited by the heat transfer ability of the roll at its warmest outer surface location.

Therefore, it is a primary object of this invention to provide an apparatus with an improved confectionary roll wherein the temperature along the entire outer shell surface of the roll is more uniformly maintained so as to allow satisfactory molded chocolate throughout the length of the roll.

It is also an object of this invention to provide an improved method for consistently molding chocolate.

It is a further object of this invention to decrease the amount of waste associated with the molding of chocolate due to varying temperatures along an exterior surface of a confectionary roll.

SUMMARY OF THE INVENTION

Briefly stated, the present invention includes an apparatus having a confectionary roll for use in molding confectionary products, comprising a rotatable cylindrical housing having cavities in its exterior surface, for receiving a liquefied confectionary medium for molding. A plurality of cooling zones are disposed within the housing. A cooling fluid is passed through these cooling zones by fluid input means, and discharged from the cooling chambers by fluid output means. Rotating means are also provided for rotating the confectionary roll arrangement. The cooling zones are preferably serially disposed, axially of the cylindrical housing and of progressively shorter axial length as their general location axially inward of the cylindrical housing is farther spaced from a fluid input to the housing.

According to the method aspect of the invention, a fluid is passed through a confectionary roll by way of cooling chambers formed by surfaces of a rotatable housing. A confectionary medium is deposited into cavities found in an outer surface of the housing, wherein cavities are of a lower temperature than the confectionary medium and are cooled by the liquid flowing through the cooling chambers. The heat transfer between the medium and the cavity surfaces causes the confectionary medium to solidify, and hence to be molded.

Another aspect of the invention includes a first and second confectionary roll of the type described above, wherein both rolls are disposed generally parallel to each other. A confectionary medium is then poured between the two rolls, whereupon a molded confectionary product is produced.

BRIEF DESCRIPTION OF THE DRAWINGS

The foregoing summary, as well as the following detailed description will be better understood when read in conjunction with the appended drawings. For the purpose of illustrating the invention, there is shown in the drawings embodiments which are presently preferred, it being understood, however that this invention is not limited to the precise arrangement and instrumentalities shown.

DESCRIPTION OF THE PREFERRED EMBODIMENTS

Figure 1:
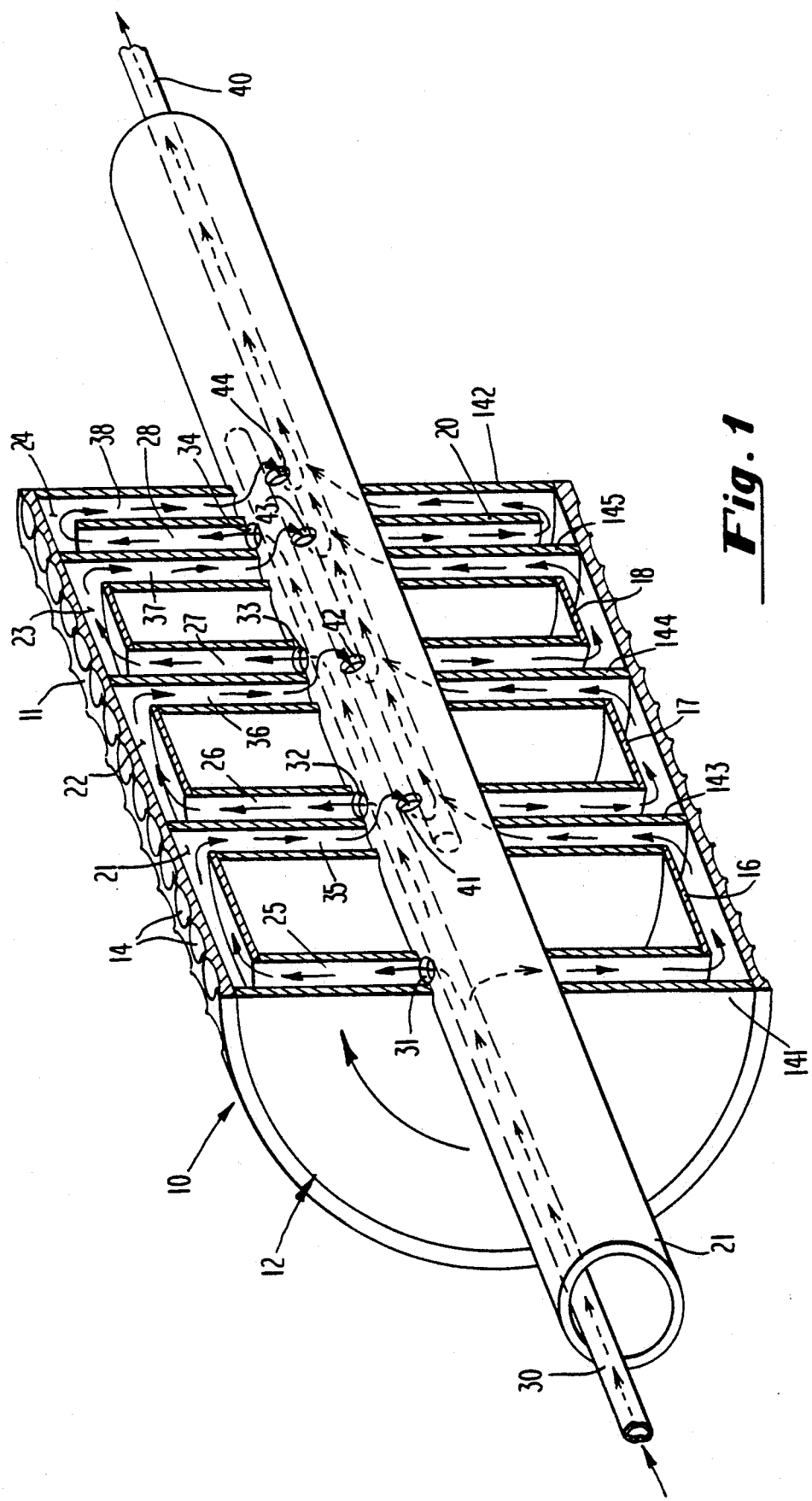
FIG. 1 is a perspective view, partially sectioned of the preferred embodiment of the confectionary roll.
Figure 2:
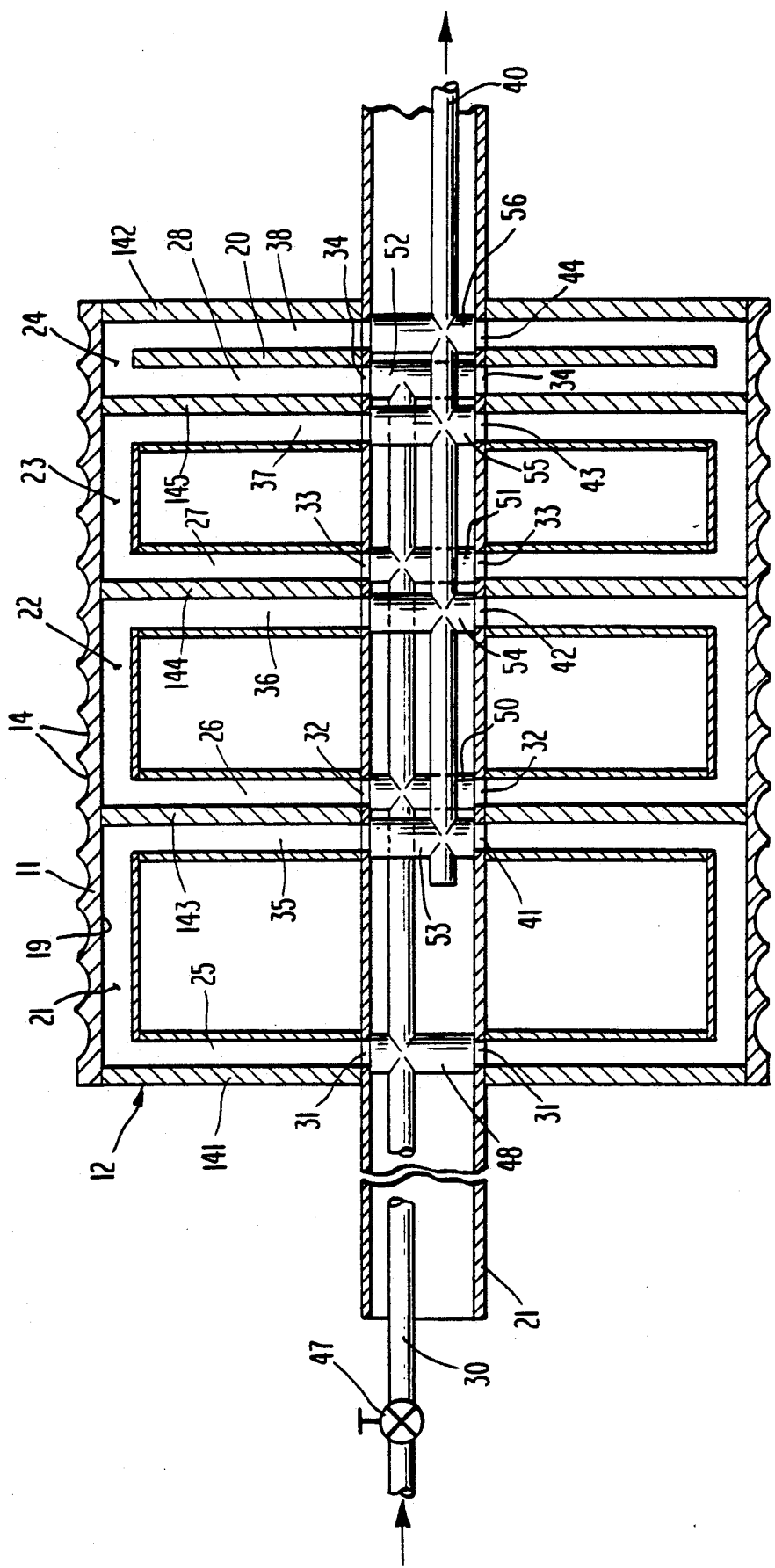
FIG. 2 is a longitudinal sectional view of the roll with internal piping for cooling fluid delivery.

Referring to the drawings, wherein like numerals indicate like elements throughout, there is shown in FIGS. 1 and 2 a confectionary roll referred to generally by reference numeral 10. The roll 10 comprises a rotatable generally cylindrical housing 12 having a plurality of cavities 14 within an exterior surface 11 of the housing 12. It is into these cavities 14 that a liquefied confectionary medium, such as chocolate, for example, is poured and subsequently molded to the particular size and shape of the cavity. It should be understood that any type of cavity or no cavities may be employed without departing from the spirit of the invention.

A plurality of rotatable inner fluid directors in the form of right circular cylindrical hollow shells 16, 17 or 18, or disk 20 are disposed within the housing 12 and are carried on the rotatable shaft 21. These inner shells 16, 17, 18 and disk 20 have outer diameters less than that of the inner surface 19 of housing 12, thereby causing annular spaces to be formed between them and the housing 12. In the preferred embodiment, four inner fluid directors 16, 17, 18 and 20, each having a length from end wall 141, measured axially along shaft 21 smaller than the one preceding it. It should be noted that any number of inner fluid directors may be employed without departing from the spirit of the invention. Inlet annular conduits 25-28 provide cooling fluid to cooling zones 21-24 respectively from a common supply conduit 30 via supply openings 31-34, as shown. Outlet annular conduits 35-38 take off cooling fluid from cooling zones 21-24 respectively and provide it to a common takeoff conduit 40 via respective openings 41-44, as shown.

The rotatable shaft 21 is concentrically disposed within the housing 12 for providing a means for both rotation and support for the housing 12 and inner fluid directors 16-20. In the preferred embodiment, the shaft 21 is integrally connected to both the housing 12 and the inner fluid directors 16-20, by welding or the like, so that when the shaft 20 rotates, it rotates the housing 12 and directors 16-20 as well.

A pair of disk-like end walls 141 and 142 are provided at ends of the housing 12, on shaft 21, carried thereby. Additionally, a plurality of disk-like interior supports 143-145 are also disposed within the housing 12 wherein they are located in between the inner fluid directors 16, 17, 18 and 20 with the hollow shaft 18 passing through their central apertures. The disks 141-145 have diameters substantially equal to that of the interior 19 of housing 12 and therefore act as dividers within the housing 12, spacing apart and separating inlet and outlet conduits 35, 26; 36, 27; and 37, 28.

By combining the interior wall 19 of the housing 12 with the exterior surfaces 16, 17, 18 and 20 of the inner fluid directors, and the opposed sides of the disks 141-145, a plurality of cooling chambers 21-24 are formed. It is through these cooling chambers 21-24 that a cooling fluid from an outside source (not shown) is passed, thereby cooling the exterior surface 11 and corresponding cavities 14 of the housing 12.

The cooling fluid is introduced into the cooling chambers via inlet fluid conduit 30, as permitted by valve 47 which runs along the length of the housing 12 within the hollow shaft 21, and is connected at one end to an outside fluid source (not shown).

Extending transverse from the inlet conduit 30 are a plurality of perpendicular inlet connectors 48, 50 51, 52, which are connected to the annular inlet conduits 25-28, respectively via openings 31-34. Cooling fluid passes through the transverse inlet conduit 21 into the cooling chambers by way of the transverse inlet connectors 48, 50, 51, 52. Transverse outlet connectors 53-56 communicating with outlet openings 31-34 respectively, allow fluid to discharge from annular conduits 35-38, respectively to outlet conduit 40.

Figure 3:
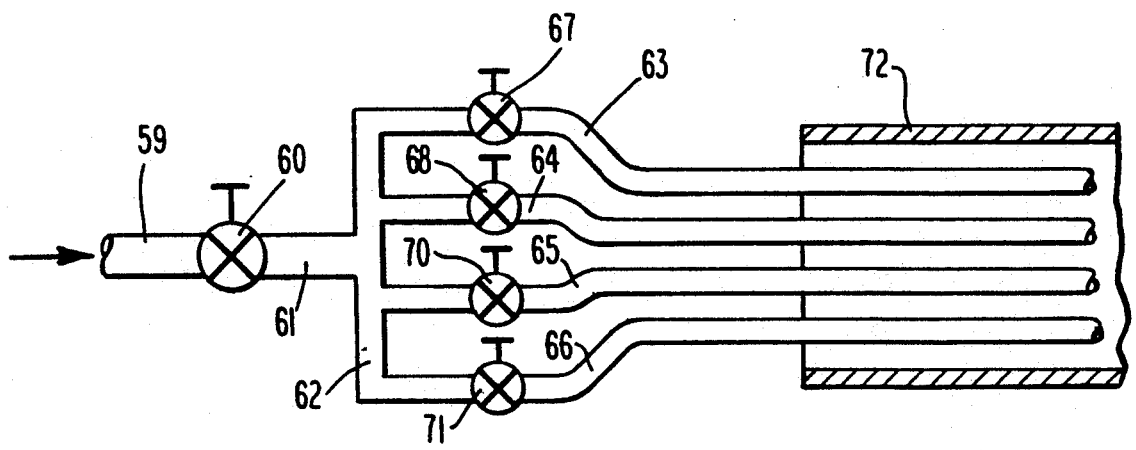
FIG. 3 is a fragmentary, longitudinal sectional view of a roll shaft like that of FIG. 2, but with a modified arrangement for internal ports for cooling fluid delivery, with individual valving for controlling fluid delivery separately for each heat transfer zone inside the roll.

In another embodiment of the present invention, best seen in FIG. 3, the cooling fluid delivered to conduit 59 by means of a sealed universal coupling (not shown) rotatable relative to conduit 59, passes main valve 60, through conduits 61 to header 62, through four individual conduits 63-66 amounts allowed by adjustment of respective valves 67, 68, 70 and 71, and into shaft 72 like that 21 of FIG. 1. According to this embodiment, fresh cooling liquid is fed into each cooling zone within the roll housing by way of the individual conduits 63-66, thereby further assuring that the exterior surface of the roll is maintained at a reasonably constant temperature irrespective of location axially along the roll, for reasonably consistently molding a confectionary medium. It should be understood that any number of conduits corresponding to the number of chambers or zones 21-24, may be used.

The confectionary roll 10 is rotated by a rotation means. The rotation means comprises a drive (not shown) commonly known in the industry, attached to one end of the shaft 21. The shaft 21 which is, in the present embodiment, integrally connected to the disks 41-45 and consequently to the housing 12, is rotated by the drive thereby causing the roll or rolls 10 to rotate, preferably with the shaft 21 freely rotating in journal bearings (not shown) during the chocolate molding process.

Figure 4:
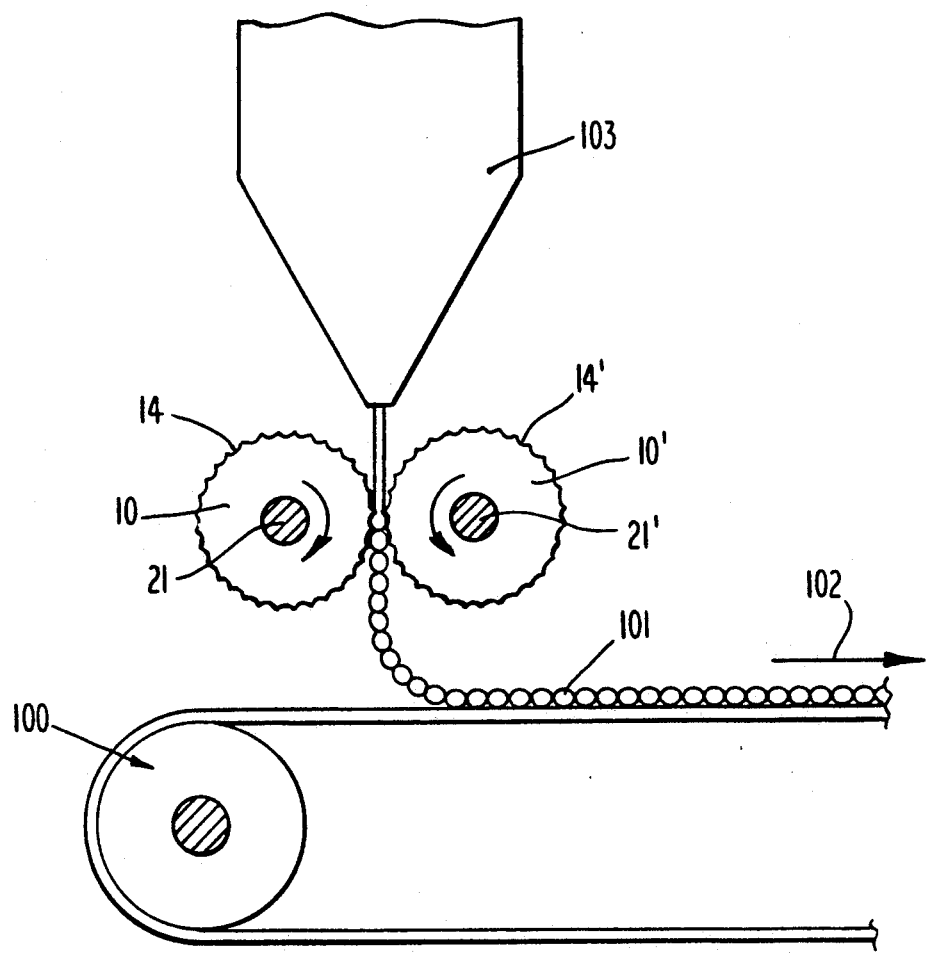
FIG. 4 is a fragmentary, side elevational view of a confectionary medium being applied between two opposed solidification rolls where it is solidified and then deposited onto a conveyor.

In operation in FIG. 4, two preferred embodiments of the roll 10 and 10' carried by shafts 21 and 21' are placed parallel to each other, having a predetermined space between them, with a conveyor system 100 below for carrying away formed confection 101 in the direction of the arrow 102. A confectionary medium is poured from a feeder 103 in between the two rolls 10 and 10'. At the same time, a cooling fluid is passed through the rolls 10 and 10' to cool the exterior surfaces of the rolls 10 and 10' and consequently their outside surface cavities 14, 14'. As the confectionary medium at an elevated temperature comes in contact with the cooled cavities, it solidifies and is thus molded. The molded product is then delivered onto the conveyor system 100 in the form of a solid ribbon 101 so that it may be further processed.

Figure 5:
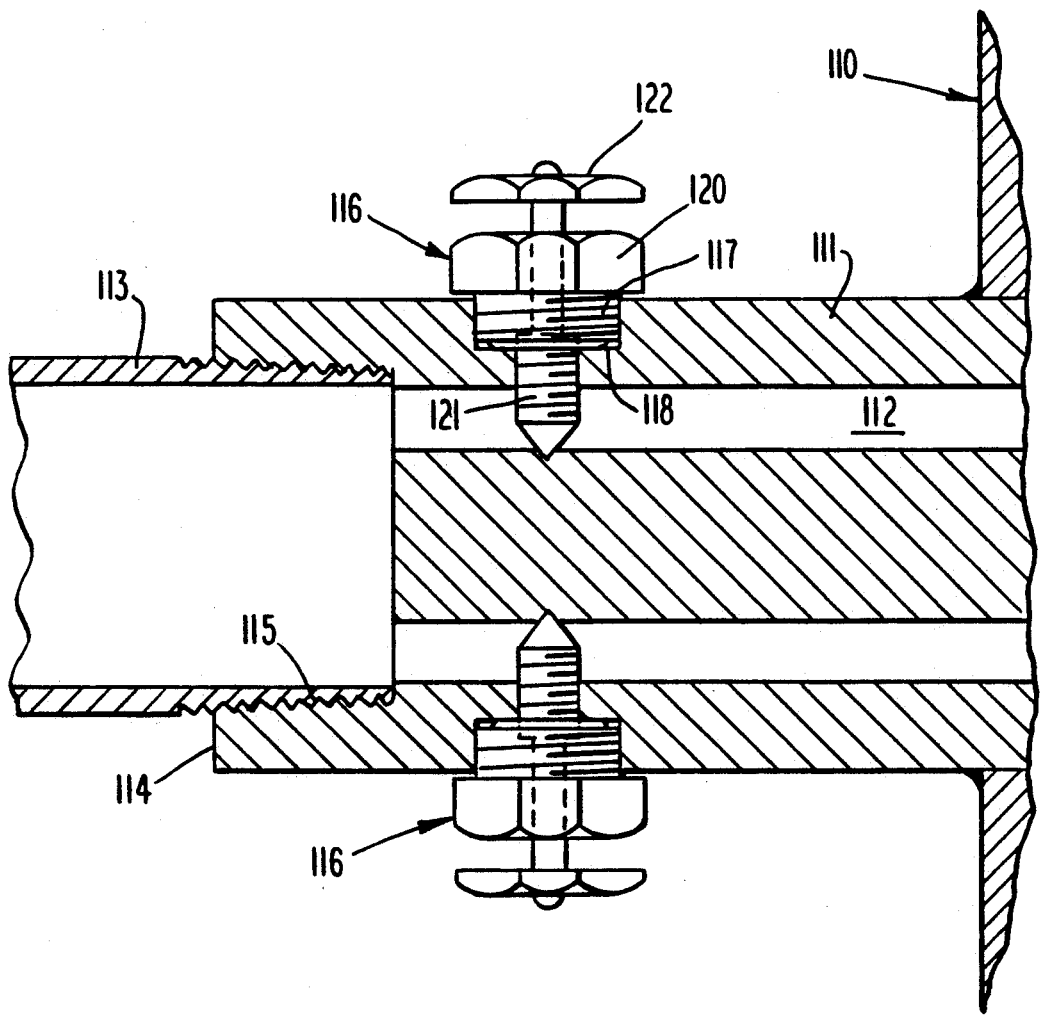
FIG. 5 is a fragmentary, longitudinal sectional view of a roll shaft like that of FIG. 3, but with an alternative arrangement for individually controlling the amount of cooling fluid delivered to cooling zones served by the cooling fluid conduits in the roll shaft.

With particular reference now to FIG. 5, there will be shown another alternative embodiment for supplying fluid to conduits in a roll generally designated by the numeral 110. In this embodiment, the shaft 111 has four conduits 112 that are provided with cooling fluid delivered from a main conduit 113 threaded or otherwise suitably carried in the left end 114, as at 115. It will be understood that conduit 113 is likewise supplied from a universal connector-type joint that is rotatable on conduit 113, for a generally fixed supply (not shown) of fluid to communicate with and deliver fluid to a conduit 113, via conventional techniques. Each of the four inlet conduits 112 correspond to the four (or more) separate cooling zones within the roll such as that described above with respect to FIG. 1, so such description need not be duplicated herein. Furthermore, in the embodiment of FIG. 5, the conduits 112 are shown as being bored or drilled down through the body of shaft 111, but such could be separate tubes disposed within a hollow shaft, if desired. In any event, each conduit 112 in the embodiment of FIG. 5 is provided with a separate fluid metering device in the form of a metering pin type fluid flow control generally designated by the numeral 116. The particular fluid control valving for the mechanism 116 is well known in valve art, and need not be described in detail, but will generally comprise a body 117 threaded or otherwise carried in a bore such as 118 of the shaft 111, the outer end 120 of the threaded portion 117 having a nut-like configuration as shown. Within this body, a needle member 121 is threadedly carried, such that upon rotation of a manually actuable knob 122, the needle member 121 will be turned to positions more greatly or in lesser amount, to interfere with passage of fluid from conduit 113 into conduit 112. Thus, a common delivery line 113 may provide various rates of flow through the respective conduits 112, consequently controlling the flow to the various cooling zones located at different positions axially away from the inlet end of fluid delivery to the roll 110 as shown in FIG. 5. The discharge of fluid from the roll 110, not being shown in FIG. 5, would be similar to that shown in FIG. 1, as respects outlet ducts communicating with a common exit fluid line.

It will be understood that, throughout this specification, references are made to a cooling fluid, and that while any fluid may directly be used, it will be preferred that the cooling fluid be a liquid medium. It will also be understood that while the preferred embodiments allow for delivery of inlet cooling fluid at one axial end of a roll and withdrawal of cooling fluid from the roll at its opposite end, alternative arrangements may also be utilized, whereby cooling fluid, once used, may be returned to be discharged from the roll at the same end at which it is delivered, with suitable locations of conduits to effect the same.

It will further be understood that while in the embodiments shown there are four separate cooling zones as one proceeds axially along a roll, that any number of different cooling zones may be utilized, up to the number that are practical for any given operation. It will further be understood that while it is shown that each of the cooling zones be progressively shorter in axial dimension as measured along a roll as that zone is spaced more greatly from the end of the roll having cooling fluid introduced thereto, that some or all of the cooling zones could be of the same length, as measured axially, if desired. It will also be understood that inside the roll, the actual construction of the different cooling zones, whether by means of a plurality of interior shells, as shown, disks, or the like, may be varied, depending upon preferred methods of construction of such zones under particular operating conditions.

It will be recognized by those skilled in the art that changes may be made to the above-described embodiment of the invention without departing from the broad inventive concepts thereof. It is understood, therefore, that this invention is not limited to the particular embodiment disclosed, but it is intended to cover all modifications which are within the scope and spirit of the invention as defined by the appended claims.

We claim:

1. In an apparatus for use in the manufacture of confectionary products and the like, in which a hardenable liquid medium of higher temperature is deposited into contact with the other surface of a fluid-cooled rotatable roll at a lower temperature, for cooling and hardening of the hardenable liquid medium during contact with the rotatable roll, wherein the apparatus includes:
   (a) a shaft;
   (b) a generally cylindrical roll carried by the shaft for rotation of the roll;
   (c) the roll having an outer generally cylindrical surface and inner surface means;
   (d) means supplying cooling fluid to the interior of the roll;
   (e) means receiving cooling fluid from the interior of the roll;
   (f) means disposed interior of the roll for directing cooling fluid interior of the roll into contact with inner surface means of said roll; the improvement comprising:
   (g) means creating separate cooling zones at the interior surface means of said roll; and
   (h) means for directing and dispersing cooling fluid supplied to the roll, into said separate cooling zones, wherein the means for directing cooling fluid include a plurality of inner, generally cylindrical shells, rotatably carried for rotation with and inside the roll; the shells generally having outer peripheries of lesser peripheral dimensions than, and spaced apart inwardly of the inner periphery of the interior surface means of the roll, and having opposite ends.

2. The apparatus of claim 1, wherein the separate cooling zones are at serially greater distances from one end of the roll as measured axially along the length of the roll.

3. The apparatus of claim 2, wherein the means supplying cooling fluid to the roll comprises means supplying it at said one end of the roll.

4. The apparatus of claim 2, wherein at least some of the separate cooling zones are of different lengths as measured axially along the roll.

5. The apparatus of claim 3, wherein at least some of the separate cooling zones are of different lengths as measured axially along the roll.

6. The apparatus of claim 5, wherein at least some of the cooling zones are of progressively decreasing lengths measured axially along the roll from the said one end of the roll.

7. The apparatus of any one of claims 2-6, wherein control means are provided for variably controlling the amount of cooling fluid to individual ones of said zones in accordance with the axial location of a said zone from said one end of said roll.

8. The apparatus of claim 7, wherein said control means are carried by the roll for rotation therewith, at an end thereof.

9. The apparatus of any one of claims 4-6, wherein control means are provided for variably controlling the amount of cooling fluid to individual ones of said zones in accordance with the axial lengths of said zones measured axially along the roll.

10. The apparatus of claim 9, wherein said control means are carried by the roll for rotation therewith, at an end thereof.

11. The apparatus of claim 1, wherein at least some of the inner shells include disk-like ends connected by generally cylindrical sleeves.

12. The apparatus of claim 1, wherein the means for directing cooling fluid include a plurality of generally disk-like supports between ends of adjacent shells and extending transverse of said roll inwardly thereof, comprising means in cooperation with adjacent ends of different shells to separate the spaces between adjacent shell ends into fluid delivery and fluid withdrawal zones.

13. The apparatus of claim 12, wherein at least some of the inner shells include disk-like ends connected by generally cylindrical sleeves.

14. The apparatus of any one of claims 1-6, wherein the outer, generally cylindrical surface of the roll includes a plurality of depressions therein for receiving generally liquid confection therein at a higher temperature than the temperature of the roll surface, for cooling and solidification of the confectionary product therein.

15. The apparatus of any one of claims 1-6, wherein there are two said rolls mounted on two said shafts that are disposed generally parallel to each other; with the rolls being disposed for rotation in opposite directions to receive a generally liquid confection therebetween; with a liquid confection dispenser disposed for dispensing liquid confection generally between said rolls; and conveyor means disposed for receiving generally solid confectionary product from between said rolls.

16. In a method for use in the manufacture of confectionary products and the like, in which a hardenable liquid medium of higher temperature is deposited into contact with the outer surface of a fluid-cooled rotatable roll at a lower temperature, for cooling and hardening of the hardenable liquid medium during contact with the rotatable roll, wherein a generally cylindrical roll is carried by the shaft for rotation of the roll; wherein cooling fluid is supplied to the interior of the roll after cooling the outer surface of the roll to solidify confectionary medium thereon; wherein cooling fluid interior of the roll is brought into contact with the inner surface of the roll, the improvement comprising: separating the cooling fluid within the roll to distinct cooling zones at the interior surface of the roll and directing and dispersing the cooling fluid supplied to the roll, into the separate cooling zones, wherein the step of directing cooling fluid includes providing a plurality of inner, generally cylindrical shell, rotatably carried for rotation with and inside the roll; the shells generally having outer peripheries of less peripheral dimensions than, and spaced apart inwardly of the inner periphery of the interior surface means of the roll, and having opposite ends.

17. The method of claim 16, wherein the separate cooling zones are provided at serially greater distances from one end of the roll is measured axially along the length of the roll.

18. The method of claim 17, wherein the cooling fluid is supplied to the roll at one end of the roll.

19. The method of claim 17, wherein at least some of the separate cooling zones are provided of different lengths as measured axially along the roll.

20. The method of claim 18, wherein at least some of the separate cooling zones are provided of different lengths as measured axially along the roll.

21. The method of claim 20, wherein at least some of the cooling zones are provided of progressively decreasing lengths measured axially along the roll from the said one end of the roll.

22. The method of any one of claims 17-21, including the step of variably controlling the amount of cooling fluid provided to individual ones of said zones in accordance with the axial location of a said zone from said one end of said roll.

23. The method of claim 22, including the step of carrying the controlling means with the roll for rotation therewith, at an end thereof.

24. The method of any one of claims 19-21, including the step of variably controlling the amount of cooling fluid to individual ones of said zones in accordance with the axial lengths of said zones measured axially along the roll.

25. The method of claim 24, including the step of carrying the controlling means with the roll for rotation therewith, at an end thereof.

26. The method of claim 16, wherein at least some of the inner shells are provided with disk-like ends connected by generally cylindrical sleeves.

27. The method of claim 16, wherein the step of directing cooling fluid includes providing a plurality of generally disk-like supports between ends of adjacent shells and extending transverse of said roll inwardly thereof to cooperate with adjacent ends of different shells to separate the spaces between adjacent shell ends into fluid delivery and fluid withdrawal zones.

28. The method of claim 27, wherein at least some of the inner shells are provided with disk-like ends connected by generally cylindrical sleeves.

29. The method of any one of claims 16-21, wherein the outer, generally cylindrical surface of the roll is provided with a plurality of depressions therein for receiving generally liquid confection therein at a higher temperature than the temperature of the roll surface, for cooling and solidification of the confectionary product therein.

30. The method of any one of claims 16-21, wherein there are provided two said rolls mounted on two said shafts that are generally parallel to each other; with the rolls being rotated in opposite directions to receive a generally liquid confection therebetween; with a liquid confection being dispensed generally between said rolls; and confectionary product from between said rolls being received by a conveyor and conveyed away from the rolls.

31. In an apparatus for use in the manufacture of solidified products from a liquid medium, in which a hardenable liquid medium of higher temperature is deposited into contact with the outer surface of a fluid-cooled rotatable roll at a lower temperature, for cooling and hardening of the hardenable liquid medium during contact with the rotatable roll, wherein the apparatus includes:
(a) a shaft;
(b) a generally cylindrical roll carried by the shaft for rotation of the roll;
(c) the roll having an outer generally cylindrical surface and inner surface means;
(d) means supplying cooling fluid to the interior of the roll;
(e) means receiving cooling fluid from the interior of the roll;
(f) means disposed interior of the roll for directing cooling fluid interior of the roll into contact with inner surface means of said roll; the improvement comprising:
(g) means creating separate cooling zones at the interior surface means of said roll; and
(h) means for directing and dispersing cooling fluid supplied to the roll, into said separate cooling zones, wherein the means for directing cooling fluid include a plurality of inner, generally cylindrical shells, rotatably carried for rotation with and inside the roll; the shells generally having outer peripheries of lesser peripheral dimensions than, and spaced apart inwardly of the inner periphery of the interior surface means of the roll, and having opposite ends.

32. In a method for use in the manufacture of solidified products from a liquid medium, in which a hardenable liquid medium of higher temperature is deposited into contact with the outer surface of a fluid-cooled rotatable roll at a lower temperature, for cooling and hardening of the hardenable liquid medium during contact with the rotatable roll, wherein a generally cylindrical roll is carried by the shaft for rotation of the roll; wherein cooling fluid is supplied to the interior of the roll; wherein cooling fluid is withdrawn from the interior of the roll after cooling the outer surface of the roll to solidify confectionary medium thereon; wherein cooling fluid interior of the roll is brought into contact with the inner surface of the roll, the improvement comprising:
separating the cooling fluid within the roll to distinct cooling zones at the interior surface of the roll and directing and dispersing the cooling fluid supplied to the roll, into the separate cooling zones, wherein the step of directing cooling fluid includes providing a plurality of inner, generally cylindrical shells, rotatably carried for rotation with and inside the roll; the shells generally having outer peripheries of less peripheral dimensions than, and spaced apart inwardly of the inner periphery of the interior surface means of the roll, and having opposite ends.

* * * * *

UNITED STATES PATENT AND TRADEMARK OFFICE
CERTIFICATE OF CORRECTION

PATENT NO. : 5,078,204

DATED : January 7, 1992

INVENTOR(S) : E. J. Loffredo and F. A. Renda

It is certified that error appears in the above-identified patent and that said Letters Patent is hereby corrected as shown below:

In column 7, line 59, after the words "the roll", first occurrence, insert --; wherein cooling fluid is withdrawn from the interior of the roll;--.

In column 7, line 68, the word "shell" should be --shells--.

Signed and Sealed this

Thirteenth Day of April, 1993

Attest:

STEPHEN G. KUNIN

*Attesting Officer*  *Acting Commissioner of Patents and Trademarks*